United States Patent

[11] 3,609,548

| [72] | Inventors | Harrie M. Allard<br>Nashua;<br>John F. Carlson, Hudson; Philip Godley, II,<br>Wilton Center, all of N.H. |
|---|---|---|
| [21] | Appl. No. | 773,445 |
| [22] | Filed | Nov. 5, 1968 |
| [45] | Patented | Sept. 28, 1971 |
| [73] | Assignee | Improved Machinery Inc.<br>Nashua, N.H. |

[54] MONITORING APPARATUS AND METHOD FOR CYCLING ELEMENTS
8 Claims, 7 Drawing Figs.

[52] U.S. Cl. .................................................. 324/161, 324/176, 340/263
[51] Int. Cl. ........................................................... G01p 3/56
[50] Field of Search ............................................. 324/68, 70; 340/262, 263, 267, 271, 268; 33/143 L, 147 N, 148 H, 149 I, 172 E, 174 L; 73/2, 5, 6, 178 T

[56] References Cited
UNITED STATES PATENTS

| 2,575,494 | 11/1951 | Hornfeck | 324/70 |
| 2,824,376 | 2/1958 | Yarrow | 33/147 |
| 2,921,259 | 1/1960 | Tice | 324/70 |
| 2,971,808 | 2/1961 | Aller | 340/267 |
| 2,996,630 | 8/1961 | Bensema | 324/68 |
| 2,750,582 | 6/1956 | Anderson | 340/268 |

Primary Examiner—Michael J. Lynch
Attorneys—Frank S. Troidl, David W. Tibbott and Robert R. Paquin ABSTRACT: This is an apparatus for monitoring the movement of a moveable member which moves from an initial position to a second position at varying speeds. A timer is actuated when the member moves from its initial position. A component in an electrical circuit connected to the member produces an electrical signal proportional to the instantaneous position of the member. An electrical indication which is responsive to the signal produces a final indication at the end of a predetermined time period which is a function of the speeds of the member. A low alarm is actuated or a high alarm is actuated if the distance of the moveable member from the initial position at the end of the predetermined time period is less or more respectively than desired.

PATENTED SEP 28 1971  3,609,548

INVENTORS
HARRIE M. ALLARD
JOHN F. CARLSON
PHILIP GODLEY II

Robert L. Paquin

ATTORNEY

INVENTORS
HARRIE M. ALLARD
JOHN F. CARLSON
PHILIP GODLEY II

MONITORING APPARATUS AND METHOD FOR CYCLING ELEMENTS

The present invention relates to monitoring apparatus and methods and more particularly to apparatus and methods for monitoring the movement of a cycling element.

Conventionally, attempts have been made to monitor the movement of a cycling element such as, by way of example, the screw of the injection unit of an injection molding machine. (It will be understood that the terms "monitor" and "monitoring" are used throughout in the broad sense to mean indication variations in and/or controlling.) These conventional attempts, however, have been limited to monitoring only a single variable of the element movement, for instance the time of travel of the element between two predetermined positions.

It is believed that this monitoring of only a single variable of the element movement does not provide sufficiently detailed and reliable monitoring of the movement of the element. By way of example, the aforementioned monitoring of only the time of travel of the element does not provide any indication as to variations in the velocity of the element occurring between the two predetermined positions. For, although the time of travel of the element between the two predetermined positions may be identical during two operating cycles, the velocity pattern of the travel between such positions may be sufficiently different to cause substantially different movement of the element during the two cycles As a result this conventional monitoring based solely on the time of travel would deem operating cycles satisfactory when, in fact, the movement of the element during the cycle is entirely unsatisfactory. In the instance of the screw of the injection unit of an injection molding machine, this unsatisfactory movement would cause the screw to provide an unsatisfactory charge and subsequently result in the formation of an unsatisfactory molded product.

An object of the present invention is to provide a new and improved method for monitoring the movement of a cycling element which is more accurate and reliable than conventional methods for its purpose.

Another object is to provide a new and improved method of the type set forth which employs a plurality of variables in its monitoring of the element.

Another object is to provide a new and improved method of the type set forth which employs both the time and distance of travel of the element in its monitoring.

In general this method comprises the steps of measuring the distance travelled by the element during a predetermined time period and providing a signal to indicate such distance of travel comparing such indication signal with a predetermined norm and providing a monitoring signal upon deviation in the indicating signal from the predetermined norm.

Another object of the invention is to provide a new and improved apparatus from monitoring the movement of a cycling element through the employment of the aforedescribed method.

In general this apparatus comprises timing means actuatable upon movement of the element from a predetermined position in its cycle to commence timing of a predetermined time period, means responsive to the movement of the element during the predetermined time period for providing an indicating signal indicating the distance travelled by the element during such time period, and means for comparing the indicating signal with a predetermined norm and operable to cause a monitoring signal when the indicating signal deviates from a predetermined norm. Referring to the drawings:

FIG. 5 illustrates three distance-time curves for the forward linear movement or injection stroke of the screw of the injection unit;

FIG. 6 is a fragmentary elevational view, partially broken away and in section, of the monitoring apparatus.

Figure 1:
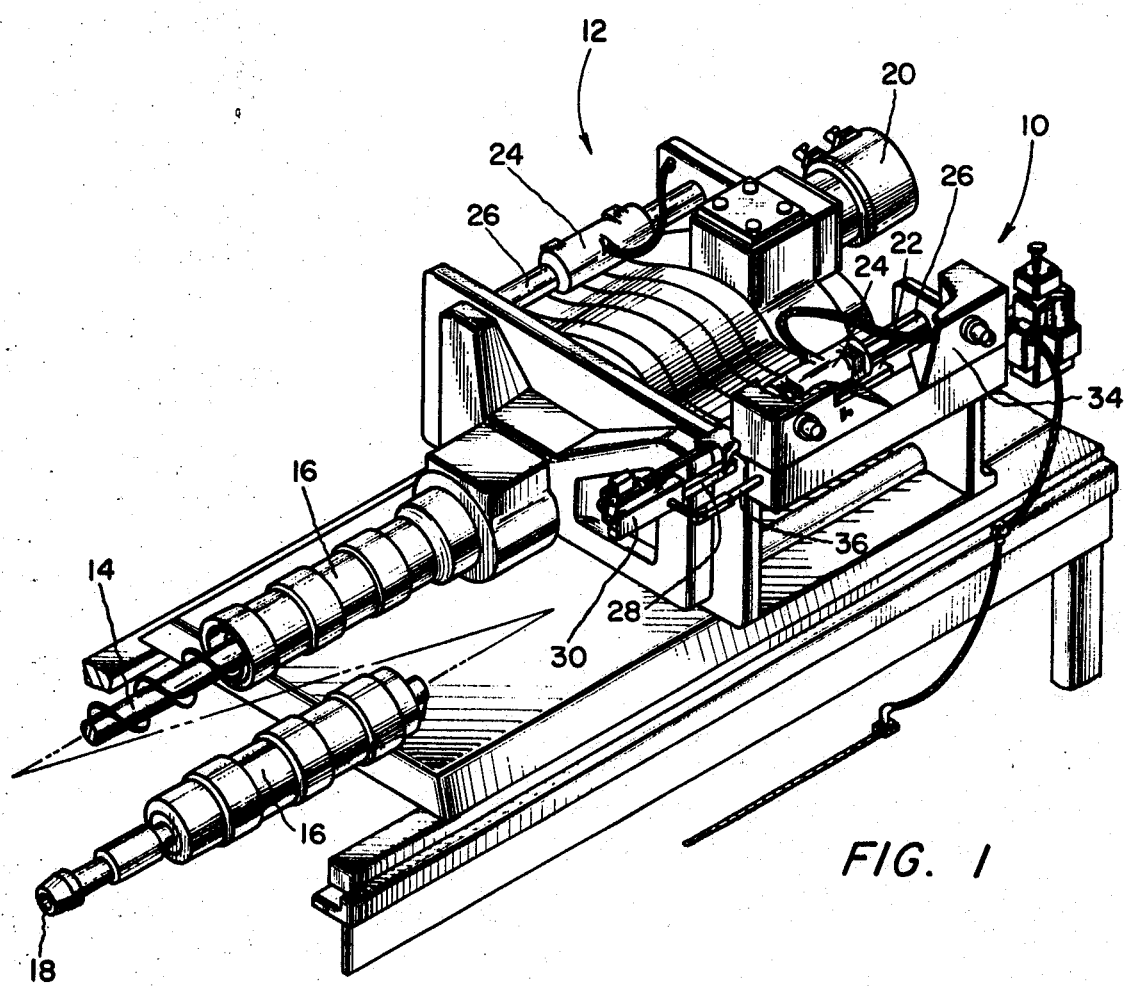
FIG. 1 is a view in perspective of a monitoring apparatus constructed in accordance with the present invention and shown in conjunction with the injection unit of a conventional injection molding machine.

Referring more particularly to the drawings wherein similar reference characters designate corresponding parts throughout the several views, 10 generally designates a monitoring apparatus which is constructed in accordance with the present invention and arranged for monitoring the operation of the injection unit 12 of a conventional injection molding machine. The injection unit 12, per se, is of conventional construction and includes an injection screw 14 rotatably disposed in an injection barrel 16 and axially cycling or reciprocating along a linear path to force plasticized material through the barrel outlet or discharge 18. The screw 14 is gear-connected to be rotatably driven by a conventional rotary motor 20 and is axially driven by a conventional rotary motor 20 and is axially driven in the manner disclosed in U.S. Pat. No. 2,734,226 issued Feb. 14, 1956, to William H. Willert. More particularly, the screw 14 is forwardly driven to inject plasticized material through the discharge 18 by a pair of conventional fluid operated cylinder-and-piston arrangements (located on opposing sides of the screw 14) one of which is generally designated as 22 in FIG. 1. The screw 14 is rearwardly driven, as described in the Willert Patent, by plasticized material extruded by the screw 14 into a cavity or chamber in the barrel 16 in advance of the screw forward end. Thus, an operating cycle of the injection unit 12 commences with the screw 14 being rotatably driven in its extreme forward position to plasticize and extrude material ahead of its forward end. When the volume of the plasticized material becomes greater than that of the then existent cavity ahead of the screw 14, the plasticized material forces the screw 14 to progressively move rearwardly in the barrel 16 to enlarge the cavity until, with the screw 14 adjacent its most rearwardly position, pressurized fluid is supplied to the cylinder-and-piston arrangements 22 to forwardly drive the screw 14 to inject the plasticized material through the discharge 18. Then the injection unit 12 is ready to commence another operating cycle which proceeds in the aforedescribed manner.

A bearing block 24, slidably mounted on a fixed tie rod 26, is connected to the upper side of the movable element of each of the cylinder-and-piston arrangements 22 whereby the bearing blocks 24 longitudinally move conjointly with the screw 14 at the same velocity and in the same direction as the movement of the latter. One of the bearing blocks 24 fixedly carries a calibrated bar 28 upon which is affixed an actuating element 30. The actuating element 30 during the rearward linear movement of the screw 14 operates a limit switch 32 to cause the latter to control suitable conventional valving such that pressurized fluid is supplied to the cylinder-and-piston arrangement 22 after a predetermined charge of plasticized material has been extruded by the screw 14 into the forward end of the barrel 16.

The illustrated monitoring apparatus 10 comprises a housing or console 34 mounted on the injection unit 12, and is actuated by an axially movable actuating rod 36 having one end 38 within the housing 34 and its other end 40 externally of the latter. The end 40 of the actuating rod 36 is connected by linkage (shown as including a link or spacer element 42 affixed to the actuating element 30, link means 44, and hook and bolt arrangements 46 fixedly interconnecting the end 40 with the link means 44 and spacer element 42) to the actuating element 30 to be axially moved upon the axial movement of the calibrated bar 28. The extent, velocity and direction of such axial movement of the actuating rod 36, as will be seen, are identical to those of the linear movement of the screw 14 concurrently occurring.

The actuating rod 36 intermediate its ends 38, 40 frictionally carries a bracket assembly 48 including an actuator plate 50 disposed laterally to the axis of the actuating rod 36.

Figure 3:
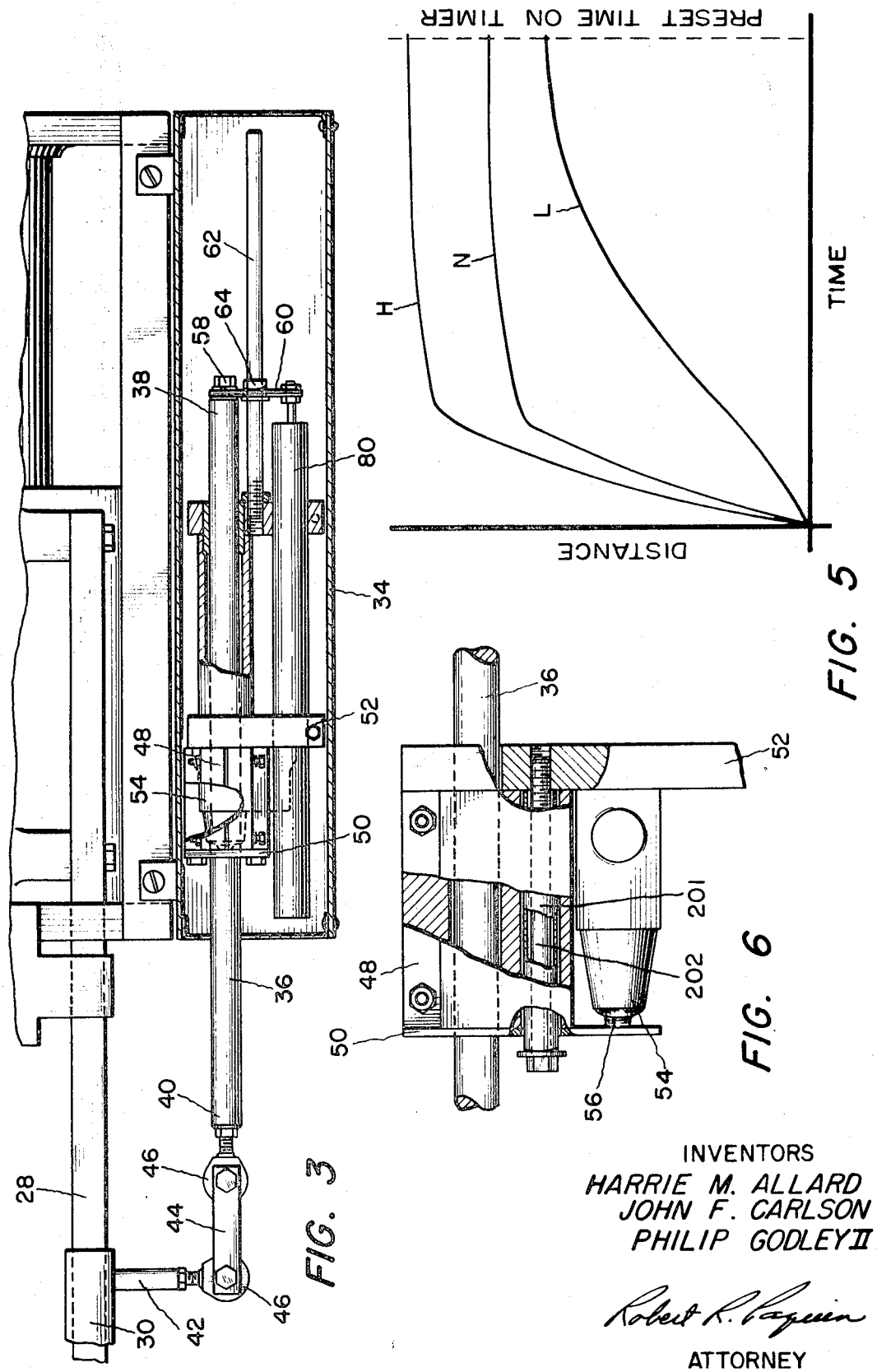
FIG. 3 is a fragmentary top or plan view, partially broken away and in section, of such monitoring apparatus.

A mounting bracket 52 fixedly mounts a limit switch 54 in the path of travel of the actuator plate 50 whereby the latter controls the operation of the switch 54. The switch 54 includes a contacting portion 56 arranged to be engaged by the actuator plate 50 and is of the type normally opened with the actuator plate 50 so engaging the contacting portion 56 and closed by movement of the plate 50 from the contacting portion 56. Thus, during the operation of the injection unit 12, axial movement of the actuating rod 36 to the right (as viewed in Fog. 3) moves the assembly 48 adjacent the mounting bracket 52 to open the limit switch 54; and, with the switch 54 open, the initial axial movement of the actuating rod 36 to the left (again as viewed in FIG. 3) immediately closes the limit switch 54 to signal the beginning of the injection stroke of the screw 14. The distance of travel of the assembly 48 to the left, as will be noted, is limited by the bolt 202 and spacer 201.

The end 38 of the actuating rod 36 is connected by a retaining element 58 to one end of a connecting element 60 which at its opposing end is connected to vary the effective resistance of a linear potentiometer 80. In this manner the effective resistance of the linear potentiometer 80 is caused to (through the actuating rod 36 and calibrated bar 28) measure the distance of linear movement of the screw 14. A fixed guide rod 62, located intermediate the actuating rod 36 and linear potentiometer 80, slidably receives a bearing 64 carried by the connecting element 60 and serves to guide the movement of the connecting element 60 arising upon the axial movement of the actuating rod 36.

Figure 4:
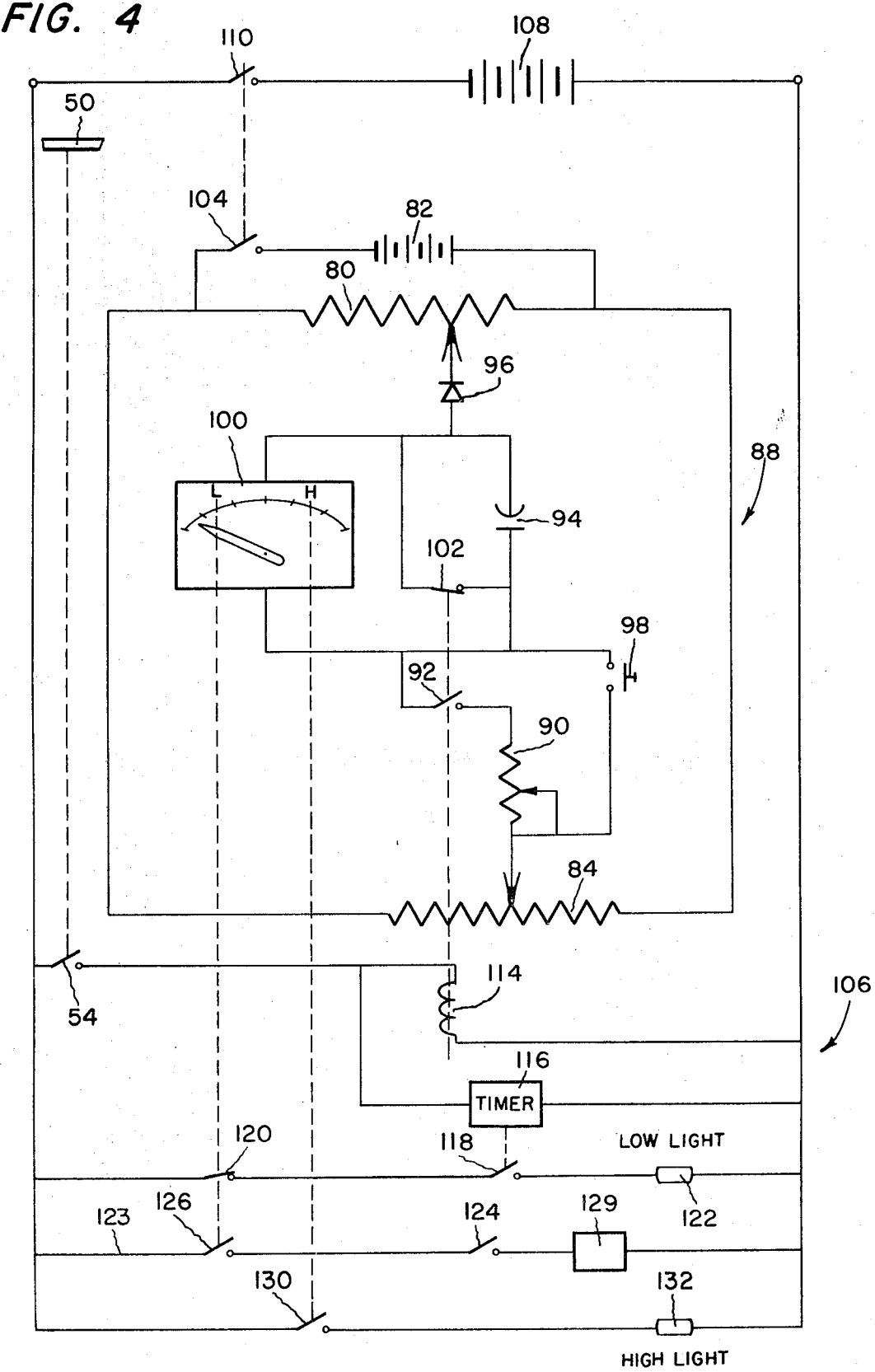
FIG. 4 is a diagrammatic or schematic view of the electrical components of the monitoring apparatus.

The electrical components of the monitoring apparatus 10 are schematically depicted in FIG. 4 and, except for the power sources, are carried by the housing 34. The potentiometers 80, 84 are connected in a bridge circuit 88. Connected between the potentiometers 80, 84 and also in the bridge circuit 88 are a variable resistance 90, a normally open switch 92, a capacitor 94, a diode 96, and a meter 100 connected to measure the charge on the capacitor 94. The bridge circuit 88 further includes a normally open, manually closed, push button switch 98 (located on the control panel 87). The variable resistance 90 is controlled by the control knob 86 on the control panel 87 to provide a suitable time constant relationship in which its setting is determined by the time period preset in a timer 116 to be hereinafter described; and the flow of electrical current from the power source 82 through the bridge circuit 88 is controlled by a control switch 104.

In addition, the electrical components of 118, monitoring apparatus 10 also include a monitoring circuit 106 operated by a power source 108 (for example, a conventional electrical storage battery) and controlled by a switch 110 which is opened and closed simultaneously with the switch 104 by a toggle 112 on the control panel 87. The aforedescribed limit switch 54 is located in the monitoring circuit 106 and connected in series with a normally deenergized solenoid relay 114 which controls the switch 92, 102 and simultaneously closes switch 92 while opening the switch 102 upon its energization by the closing of the limit switch 54. A timer 116, also in series with the limit switch 54 to be actuated upon the closing of the latter, controls a normally open switch 118 which is in parallel with the limit switch 54 and after the time period preset in the timer 116 closes such switch 118 and also actuates the valving for the cylinder-and-piston arrangements 22 to stop fluid flow to the latter and hence stop the forward movement of the screw 14. The time period preset in the timer 116 is predetermined as the optimum time period for the screw 14 to inject a charge suitable to form a satisfactory part.

The switch 118 is connected in series with an alarm in the form of an indicator light 122 (hereinafter called the low-light) and a normally closed switch 120 controlled by the meter 100 to be opened by the latter when the charge on the capacitor 94 attains a predetermined minimum level. The time period preset in the timer 116 is, of course, sufficient such that the meter 100 normally opens the switch 120 prior to the closing of the switch 118 when the capacitor 94 is charged at a rate indicative of satisfactory operation of the screw 14. Thus, the low-light 122 is only lit in the event that the charge on the capacitor 94 does not within the time period indicative of satisfactory operation of the screw 14 attain the aforementioned predetermined minimum. A normally open switch 130, controlled by the meter 100 to be closed when the charge on the capacitor 94 does not with in the time period indicative of satisfactory operation of the screw 14 attain the aforementioned predetermined minimum. A normally open switch 130, controlled by the meter 100 to be closed when the charge on the capacitor 94 exceeds a predetermined maximum, is connected in series with an alarm in the form of an indicator light 132 (hereinafter called the high-light). This high-light 132, as will be seen, is lit only when the capacitor charge exceeds the aforementioned predetermined maximum.

From the preceding description of the monitoring apparatus 10 it will be seen that, during the forward linear movement or injection stroke of the screw 14 to force a charge of plasticized material through the discharge 18, the accompanying axial movement of the actuating rod 36 varies the effective resistance of the linear potentiometer 80. Hence, the linear potentiometer 80 measures the distance of the movement of the screw 14 during this forward portion of its driven cycle; and the charge on the capacitor 94 during such movement of the screw 14, being determined by the resistance of the linear potentiometer 80, varies with the distance of screw movement. The timer 116 measures the time of the forward screw movement; and as will be apparent from the description the monitoring apparatus 10 in effect measures and is responsive to, the velocity of the screw 14 during its linear forward movement. This screw velocity is indicative of the charge of plasticized material injected by the screw 14 and must follow a predetermined norm or normal pattern otherwise the part produced from the injected charge will be unsatisfactory. In this manner, the monitoring apparatus 10 monitors the charge and provides an electrical signal to the low or high-lights 122, 132, respectively, to indicate deviations from the norm.

In addition, the apparatus 10 may be operated to control the forward or injection stroke of the screw 14. More particularly, as shown in FIG. 4, a control line 123, containing a switch 124 controlled by a toggle 125 on the control panel 87 and also containing a normally open switch 126 closed by the meter 100 concurrently with the opening of the switch 120, is provided. The control line 123 is electrically connected to a control switch 129 governing the valving for the cylinder-and-piston arrangements 22 to cause the control switch 129 to actuate the valving to stop fluid flow to the arrangements 22 and, hence stop the forward movement of the screw 14, when an electrical signal is transmitted through the line 123. Thus, by selective operation of the toggle 125, the monitoring apparatus 10 may be selectively employed for controlling the forward movement of the screw 14. Moreover, during the employment of the monitoring apparatus 10 as a control, the indication features of the low-light 122 are also employed to visually denote the screw movement, but the high-light 132 is, of course, inoperative. (It will be understood that the time period preset in the timer 116 may be slightly increased with the toggle 125 positioned to close the switch 124 whereby, should the control switch 129 be energized after the extended time setting on the timer 116, the low-light 122 will indicate a deviation from the norm.

In the practice of the method of the present invention by the monitoring apparatus 10, the injection unit 12 is operated such that the forward linear movement of the screw 14 provides through the discharge 18 a charge suitable to provide a satisfactory or acceptable part. (This forward movement of the s crew 14 will approximate the distance-time curve N shown in FIG. 5, and as indicated by the curve N is characterized by rapidly increasing velocity followed by substantially constant velocity.)

The timer 116 is present with the time period necessary for the screw 14 to inject this charge suitable to form a satisfactory part; and the potentiometers 80, 84 are balanced to provide a zero voltage differential therebetween. The low-limit on meter 100 is then set to open the switch 120 before the switch 118 is resultantly closed by the timer 116, and the high-limit on the meter 100 is set at a value which is incrementally higher than the voltage deflection indicated on the meter 100 when the time setting on timer 116 expires. This establishes the monitoring limits for the apparatus 10.

Thereafter, as an increasing voltage differential arises between the potentiometers 80, 84, the monitoring apparatus 10 measures the time and distance of the forward linear screw movement and provides electrical signals to the low-light 122, high-light 132 and, if the switch 124 be closed, to the control 129, in response to deviations of the screw 14 from the aforementioned forward movement providing a satisfactory charge.

More particularly, during the forward movement or injection stroke of the screw 14 the calibrated bar 28 and actuating rod 36 are conjointly moved in the same direction as the screw 14. This movement of tee actuating rod 36 causes the linear potentiometer 80 to measure the distance of movement of the screw 14 and also draws the actuator plate 50 from the contacting portion 56 of the limit switch 54, thereby closing the latter. The closing of the limit switch 54 actuates the timer 116 to begin its calculation of the preset time period and also energizes the solenoid relay 114 which, in turn, closes the switch 92 while opening the switch 102. The unbalance of the potentiometers 80, 84 thereafter, as will be seen varies in accordance with the variation in the effective resistance of the linear potentiometer 80; and the voltage differential between the potentiometers 80, 84 increases during the forward linear movement of the screw 14. The capacitor 94 is accordingly charged.

Assuming the forward movement of the screw 1 4 to be at the rate suitable for providing a satisfactory part, the charge on the capacitor 94 increases to a level sufficient to cause the meter 100 to open the switch 120 prior to the end of the timer time period and, consequently, the switch 120 will be opened prior to the switch 118 being closed. Thus, in this event no electrical signal is provided to either the low light 122 or the machine control 129. In the event, however, the forward movement of the screw 14 is too slow to enable the capacitor 94 to attain the optimum charge prior to the expiration of the timer time period, the switch 120 will remain closed until after the timer 116 closes the switch 118. Hence, in this latter event an electrical signal is supplied to the low-light 122 to denote the unsatisfactory movement of the screw 14 and, if the switch 124 be closed whereby the monitoring apparatus 10 controls the injection unit 12, an electrical signal is also sent to the control 129 to stop the forward movement of the screw 14 of the injection unit 12. (A typical movement curve of the screw 14 in this latter event is depicted as L in FIG. 5).

In the event that the forward movement of the screw 14 is too fast, (assuming the switch 124 to be open such that the apparatus 10 does not operate as a control), the capacitor 94 will charge to a level sufficiently high to indicate an unsatisfactory charge of plasticized material supplied by the screw 14. Thus, the meter 100 will close the switch 130 to resultantly send an electrical signal to the high-light 132 denoting this fact. (An example of a curve of movement of the screw 14 in this latter event is depicted as H in FIG. 5).

Figure 7:
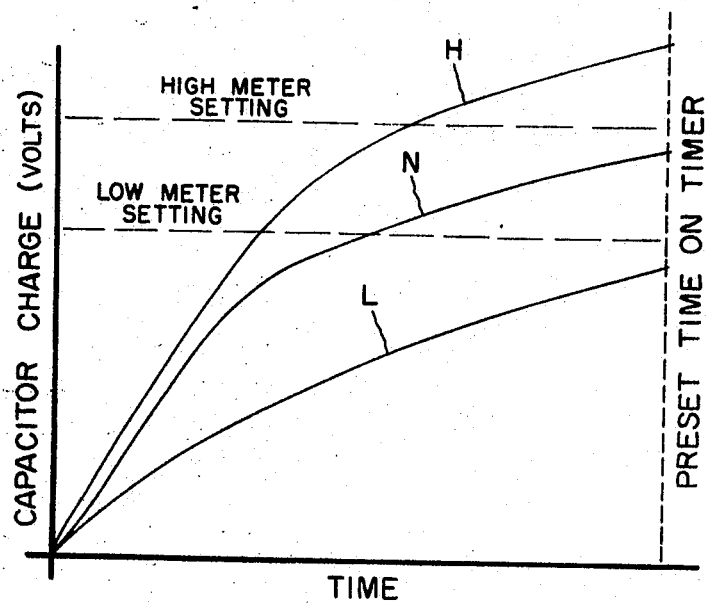
FIG. 7 illustrates three curves representing the charge on the capacitor of the illustrated apparatus as a function of time.
Figure 2:
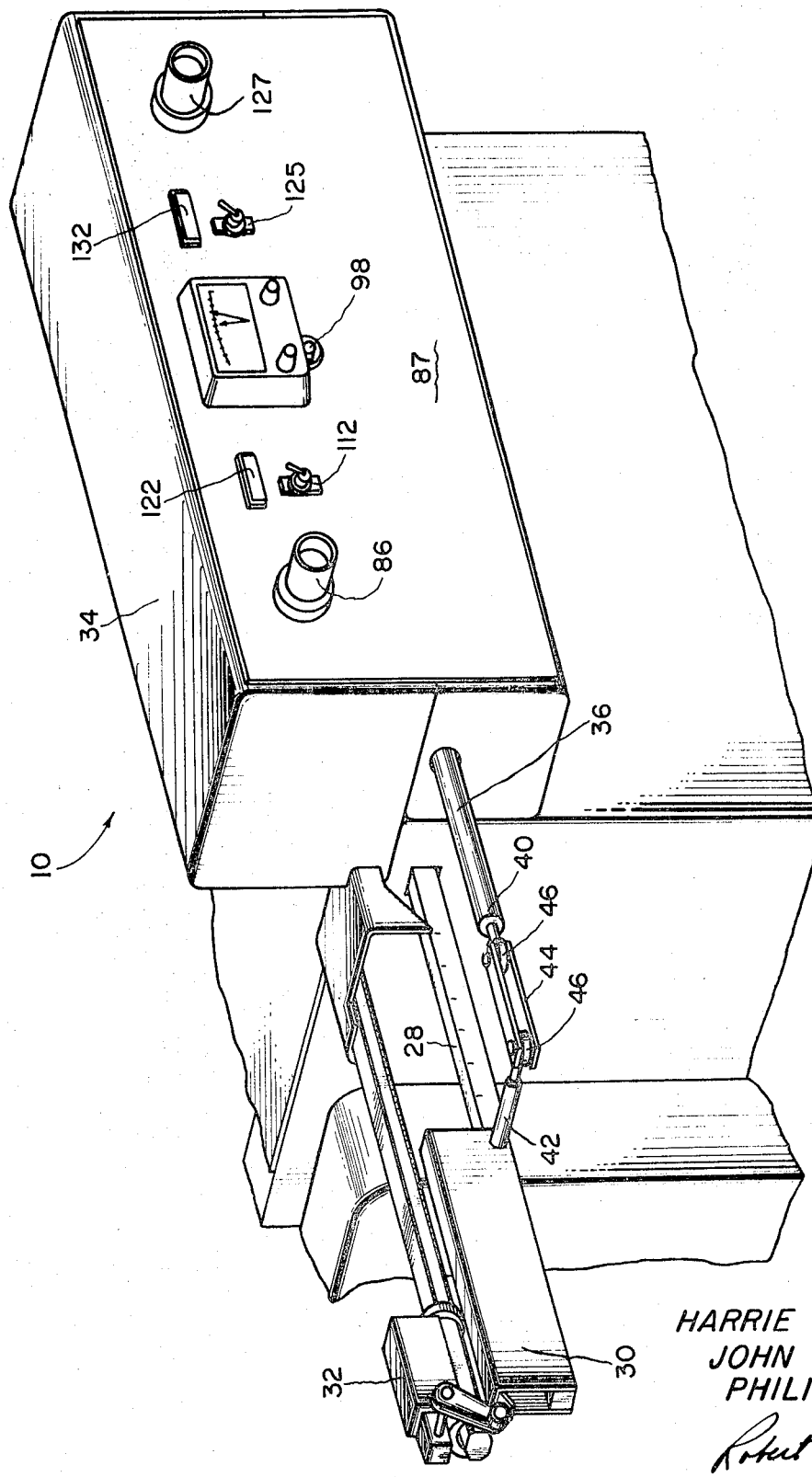
FIG. 2 is an enlarged view in perspective of the monitoring apparatus shown in FIG. 1.

FIG. 7, wherein the charge on the capacitor 94 is shown as a function of time, illustrates three capacitor charge curves labeled H, N and L which represent the rate of charge on the capacitor during the movement of the screw 14 in the manner depicted by the curves H, N and L, respectively, in FIG. 5. It is believed that the charge accumulated by the capacitor is a function of the integrated area under the appropriate distance-time curve shown in FIG. 5 for each of the movements of the screw 14.

From the preceding description it will be seen that our new and improved method of monitoring the movement of a cycling element in general comprises measuring the time and distance of travel for the element during at least a portion of its cycle, and resultantly comprises measuring the velocity of the element during such portion of its cycle. These measured factors are, moreover, employed to provide an electrical or other signal when the movement of the element deviates from a predetermined norm, and our method contemplates employing this signal as an indication of the movement of the element.

It will be understood, however, that, although we have illustrated and hereinbefore specifically described only one embodiment of an apparatus for carrying out this method, this single embodiment has been given only by way of illustration, and the spirit and scope of the present invention are not limited merely to this single embodiment but rather contemplate other embodiments and variations within the scope of the following claims.

Having thus described our invention, we claim:

1. An apparatus for monitoring the movement of a cycling element, comprising timing means preset with a predetermined time period and actuatable to commence timing means upon movement of the element from a predetermined position in its cycle, a pair of potentiometers, one of said potentiometers being connected to the element to cause the effective resistance of said one potentiometer to be varied during movement of the element during the predetermined time period and said potentiometers being interconnected in a bridge circuit whereby the variance in the voltage differential between the potentiometers during movement of the element during the predetermined time period indicates the distance travelled by the element during such time period, a capacitor connected between said potentiometers to be subjected to said voltage differential and variable in said voltage differential, means connected to said capacitor for measuring the electrical charge on said capacitor and comparing such charge with a predetermined norm, and means actuatable for providing a monitoring signal, said comparing means and said timing means being connected to said monitoring signal providing means to cause the latter to be actuated when the voltage differential causes the charge on said capacitor to deviate from a predetermined norm.

2. A monitoring apparatus according to claim 1, wherein said monitoring signal providing means comprises first alarm means actuatable to denote the failure of the charge on said capacitor to attain a predetermined minimum level in the predetermined time period, and second alarm means actuatable to denote the charge on said capacitor exceeding a predetermined maximum level.

3. A monitoring apparatus according to claim 1, wherein said monitoring signal providing means comprising control means actuatable for control of the movement of the element.

4. An apparatus for monitoring the movement of a movable member comprising: timing means adapted to be preset with a predetermined time period and actuatable to commence timing of such time period; a member movable from an initial position to a second position, the movement of the member from the initial position to the second position being at varying speeds; means to actuate said timing means when said member moves from said initial position; an electrical circuit having a component connected to said member, and producing an electrical signal proportional to the instantaneous position of said member, said circuit including an electrical indicating means responsive to said signal for establishing a final indication which is a function of the speeds of said member as it moves from the initial position to the second position, said electrical circuit also including a first switching member actuable in response to a first indication of the indicating means and a second switching member actuatable in response to a second indication of the indicating means during the predetermined time period, and means connected to said first switching member and said timing means for comparing the relative operation times of said timing means for comparing the relative operation times of said timing means and said first switching member, said first and second indications being such that the first switching member is actuated in response to said first indication and the second switching member is not actuated when the second position is within a predetermined distance range from its initial position.

5. An apparatus in accordance with claim 4 wherein: the first switching member is a normally closed switch, a normally open switch actuated by the timing means is in series with the normally closed switch, and an alarm is in series with the normally closed switch and the normally open switch; and the second switching member is a normally open switch, and an alarm is in series with the normally open switch.

6. An apparatus in accordance with claim 4 wherein: the indicating means includes a capacitor adapted to be charged by said signal at a rate which is a function of the speeds of said movable member.

7. An apparatus in accordance with claim 5 wherein: the indicating means includes a capacitor adapted to be charged by said signal at a rate which is a function of the speeds of said movable member.

8. An apparatus in accordance with claim 7 wherein: the indicating means also includes a meter connected to the capacitor for continuously indicating the charge on the capacitor.